Sept. 1, 1970  W. H. BUELOW  3,526,392

METHOD OF HAULING AND MIXING CONCRETE

Filed May 20, 1968

INVENTOR
WILLIAM H. BUELOW

BY

Sughrue, Rothwell, Mion, Zinn & Macpeak
ATTORNEYS

United States Patent Office 3,526,392
Patented Sept. 1, 1970

3,526,392
METHOD OF HAULING AND MIXING CONCRETE
William H. Buelow, Brookfield, Wis., assignor to Rex Chainbelt Inc., Milwaukee, Wis., a corporation of Wisconsin
Filed May 20, 1968, Ser. No. 732,490
Int. Cl. B28c 7/02
U.S. Cl. 259—148                    1 Claim

ABSTRACT OF THE DISCLOSURE

A concrete mixing truck and towed trailer have spaced wheels for hauling ingredients of concrete mix over a highway having a maximum legal load limit with some fraction of the ingredients of the concrete mix in the truck and the remaining portion of the ingredients in the trailer. At a job site where the maximum legal load limit does not apply a conveyor on the trailer transfers the trailer carried ingredients to the truck for mixing in a drum which has the capacity for the entire batch of ingredients.

BACKGROUND OF THE INVENTION

Field of the invention

This invention relates to improvements in a method of hauling and mixing concrete. More particularly, the invention relates to a concrete mixer truck and towed trailer each having spaced wheels, and each being capable of carrying separate portions of the ingredients of a batch of concrete over a roadway within a maximum legal load limit, while the mixer truck has a capacity to mix all of the ingredients at a job site where the legal load limits do not apply.

Description of the prior art

It is highly desirable from an economic standpoint to provide larger pay loads of concrete mix of the type carried by a concrete mixing truck to a job site. This obviously contributes to the economics of construction in decreasing the labor cost as well as the other costs per unit of mixed concrete.

However, most of the highways of the United States are governed by laws regulating a maximum legal weight limit according to various formulas which relate weight to wheel spacing and the like. An ordinary concrete mixer truck under most weight laws can carry only a predetermined maximum amount of concrete in order to stay within the maximum legal weight limit.

One approach known in the prior art to increase the pay load of a concrete mixer truck is to utilize trailing wheels with a load transfer device to transfer some of the heavy load from the wheels underneath the mixing drum to the trailing wheels and leading wheels. However, such weight transfer arrangements are unstable and unsafe on the highway due to the load transferring and the close spacing of the trailing wheels. Furthermore, there is a limit to which the pay load can be increased due to the spacing of the load transfer trailing wheels and the weight laws.

It is also known in the prior art to carry the ingredients for a second batch of concrete in a trailer pulled by a concrete truck mixer which carries a first batch of concrete. This approach has not been commercially adopted since the saving in labor is not great and it does not contribute to the economies. In other words, a batch in a regular truck mixer has to be mixed and dumped and then it has to come back to the trailer for receiving another batch which then has to be mixed while at the site. Furthermore, in such known art the trailer has to be elevated in order to provide a means of transferring the batch from the trailer to the truck mixer.

SUMMARY OF THE INVENTION

This invention provides a concrete mixing truck and towed trailer combination which can increase the pay load while staying within the highway weight limit laws and provide greater stability and hence much greater safety than the known weight transfer devices. The mixer truck and trailer combination of this invention has the additional advantage of mobility at a job site where the weight laws are not applied and the trailer has much more stability than a weight transfer arrangement. In other words the invention has the stability of a trailer and the mobility of a truck mixer while greatly increasing the pay load.

The mixer truck and trailer combination includes a truck having a wheel-supported, motor-driven body with a concrete mixing drum having ingredient receiving and discharge opening means and a trailer hitch means which is connected to a tow bar of a wheel-supported trailer having a container for the portion of the ingredients. The truck and trailer combination operates over a highway having a maximum legal load limit to a job site with some fraction of the ingredients of the concrete mix in the truck and the remaining ingredients in the trailer. At the job site a conveyor carried by the trailer discharges the ingredients from the container bin of the trailer to the charging opening of the drum. The trailer may be detached from the truck while the ingredients of the entire batch of mix in the truck may be driven about the job site for delivery of the concrete mix.

DETAILED DESCRIPTION OF THE PREFERRED EMBODIMENT

Figure 1:
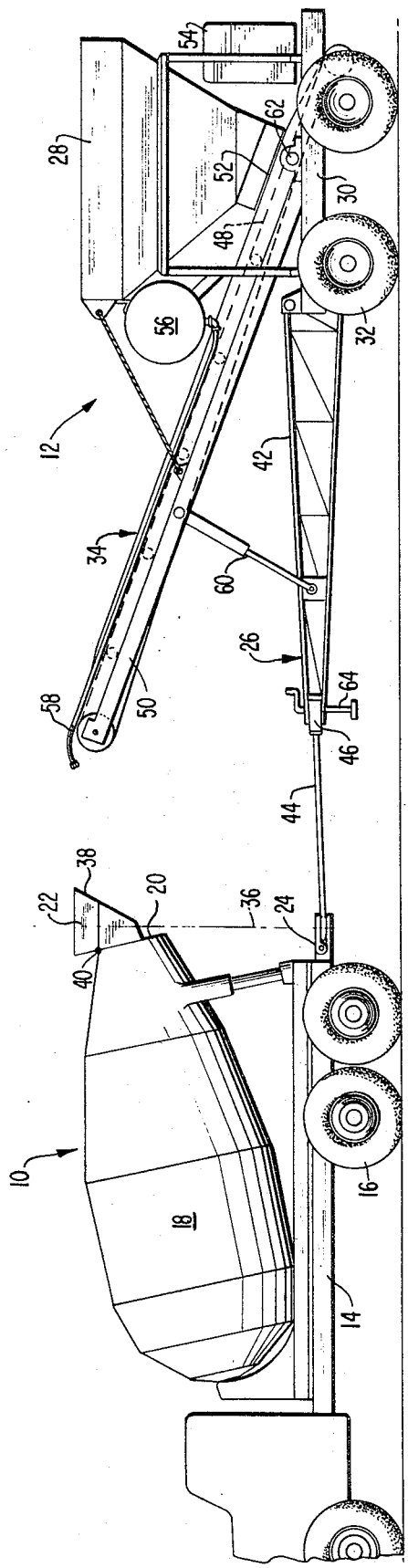
FIG. 1 is a side elevation view of a concrete mixer truck and towed trailer of this invention shown in semi-schematic form for illustrating the inventive concept.

A concrete mixer truck 10 is of conventional construction although it preferably has a capacity which, when filled with concrete and driven without a trailer, would exceed the maximum load limits of the highway weight laws. The concrete mixer truck of this invention is used in combination with a trailer 12 for carrying a portion of the ingredients of the concrete mix.

The truck 10 has a hauling body 14, spaced wheels 16 for the wheel base to suit maneuverability and legal requirements, and a mixing drum 18 of any suitable known type. The mixing drum will have a discharge means, including a discharge opening and usual discharge chute as well as an ingredient receiving means such as hopper 22. At the rear of the truck there is a trailer hitch 24 of any known construction allowing pivoting about a vertical pivot.

The trailer 12 includes a tow means 26 in the form of a suitable tow bar and a container or bin 28 for a portion of the ingredients for concrete batch. The container 28 is supported from a frame 30 which is mounted on spaced wheels 32. The distance between wheels 32 and wheels 16 of the truck are set for a practical maximum under the trailer law, but with a portion of the ingredients of a concrete batch in the mixer drum 18 and the remaining portion in the bin 28 the larger pay load still complies with the highway load laws. Mounted on the trailer 12 is a suitable conveyor 34 for transferring the ingredients from container of bin 28 into the ingredient receiving means or hopper 22 of the mixer truck drum 18.

The vertical pivot axis 36 of hitch 24 is positioned under the hopper so that the unit may turn corners without the conveyor 34 extending beyond the turning radius of the truck and trailer. The pivot axis 36 is also beneath hopper 22 so that the trailer does not have to be positioned directly behind the truck but can be at right angles or any intermediate position when loading. The hopper 22 may be split with a pivoted top section 38 connected by a horizontal pivot 40, see FIG. 3.

The tow bar means 26 may include a truss 42 and a tow bar 44 telescopically mounted in a slide bearing member 46 for bringing the conveyor 34 closer to the hopper 22.

The conveyor 34 may be of any suitable type such as one having a belt 48 carried by a frame 50 extending from a bottom opening 52 in the bottom of bin 28 upwardly and forwardly. A conveyor drive motor 54 may be carried on the trailer 12.

An alternative construction is to have a portion of the water forming a portion of the ingredients of the concrete mix carried by water tank 56 if necessary and fed by hose 58 into the hopper 22 with the other ingredients in container bin 28.

In the arrangement shown a brace leg 60 which may be a telescoping cylinder could be used to raise the front end of conveyor 64. A number of other constructions could be utilized and in fact with the split hopper 22 in some embodiments it is not necessary to raise the front end of the conveyor 34.

Various alternatives are contemplated within the inventive concept as defined in the claim. For example, the conveyor 34 may be any type of conveyor including a fluid conveyor, screw conveyor or the like. The container or bin 28 may in itself be a mixer drum. The tow means may be rigid or pivoted to the trailer 12 and the conveyor may be raised by mechanical means or may be rigid. The wheels of the trailer could be dual wheels, and other variations may be contemplated in the mixer drum ingredient receiving opening and discharge of the mixer 10. Also, the conveyor 34 may be extensible instead of the tow bar or the end of the conveyor might be foldable so as to be clear of the hopper while travelling over the highway.

The operation of the mixer truck and trailer will now be described in connection with the method of this invention.

Figure 3:
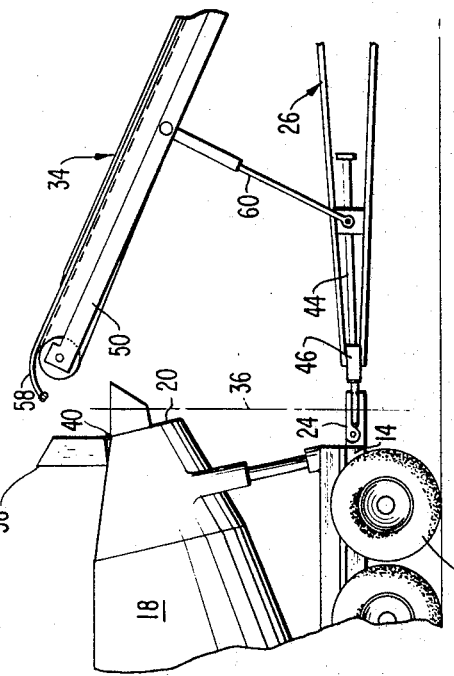
FIG. 3 shows parts of the mixer truck and trailer conveyor in position for transferring the contents of the trailer to the drum of the mixer truck.
Figure 2:
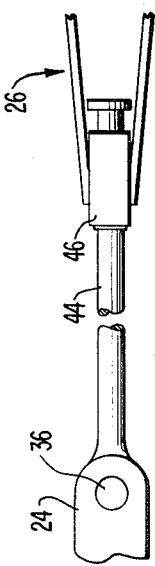
FIG. 2 is a top plan view of the details of the truck and trailer connection of one possible embodiment.

A batch of concrete is charged with a portion of the batch in mixing drum 18 of truck 10 and the remaining portion of the ingredients in container 28 on trailer 12. It has been found that in practice approximately ¾ of the ingredients by weight may be contained in the mixer drum 18. The truck 10 and towed trailer 12 are then moved over a highway having maximum legal weight limits with the truck 10 towing the trailer until they reach a job site where the weight laws do not apply. At that time, the conveyor 34 transfers the contents of bin 28 into mixer drum 18. In order to accomplish this in the embodiment shown, the tow bar 44 is telescoped and the upper portion 38 of the hopper may be pivoted as shown in FIG. 3. If necessary, the discharge end of conveyor 34 can be raised. With the conveyor belt 48 moving, the ingredients will quickly be charged into the drum 18 and the rotating drum will mix the entire large batch. The trailer hitch 24 is disconnected from the tow bar 44 and the trailer may rest on jack stand 64. The truck may then be driven around to the job site and the concrete may be discharged as required.

As a nonlimiting example, the truck 10 can have a mixing drum 18 of 11 cubic yard capacity which if filled with the standard concrete mix and driven by itself would exceed the maximum legal weight limit of most jurisdictions. However, the drum 18 is filled with only 6½ cubic yards of the ingredients and the remaining 4½ cubic yards are carried by bin 28. On reaching a job site the portion of the ingredients from bin 28 is charged into the mixing drum 18 and the entire 11 cubic yards is mixed and then delivered while at the job site.

What is claimed is:

1. A method of hauling and mixing concrete ingredients over a roadway having a maximum legal weight limit to a job site while increasing the payload and providing increased safety and stability of a hauling and mixing vehicle, the method comprising; hauling a portion of the ingredients of a batch of concrete in a truck mixer having a carrying capacity substantially greater than allowed by the maximum legal weight limit, the portion of the ingredients hauled in the truck mixer being less than the carrying capacity to allow the truck to comply with the maximum legal weight limit, carrying the remaining portion of the ingredients of the batch in a trailer, towing the trailer from the truck over a roadway having a maximum legal weight limit from a charging area to a job site, transferring the remaining portion of the ingredients from the trailer to the truck mixer at the job site where the maximum legal weight limit does not apply, mixing the entire batch in the truck mixer at the job site, and discharging the mixed concrete from the truck mixer at the job site.

References Cited
UNITED STATES PATENTS

| | | | |
|---|---|---|---|
| 2,578,170 | 12/1951 | Bohmer | 259—161 |
| 2,811,268 | 10/1957 | Kayser | 259—165 |
| 2,884,235 | 4/1959 | Broberg | 259—161 |
| 2,896,771 | 7/1959 | Mecham | 259—165 |
| 2,845,684 | 7/1960 | Soldini | 259—165 X |

ROBERT W. JENKINS, Primary Examiner

U.S. Cl. X.R.

259—161